United States Patent
Kamoi (10) Patent No.: US 11,528,380 B2
(45) Date of Patent: Dec. 13, 2022

(54) INFORMATION PROCESSING APPARATUS THAT PERFORMS INQUIRY BEFORE OUTPUTTING IMAGE

(71) Applicant: FUJIFILM BUSINESS INNOVATION CORP., Tokyo (JP)

(72) Inventor: Yusuke Kamoi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/169,702

(22) Filed: Feb. 8, 2021

(65) Prior Publication Data

US 2022/0006916 A1 Jan. 6, 2022

(30) Foreign Application Priority Data

Jul. 2, 2020 (JP) .............................. JP2020-114984

(51) Int. Cl.
| | |
|---|---|
| *H04N 1/00* | (2006.01) |
| *H04N 1/32* | (2006.01) |
| *G06F 3/12* | (2006.01) |
| *H04N 1/44* | (2006.01) |

(52) U.S. Cl.
CPC ........ *H04N 1/00875* (2013.01); *G06F 3/1222* (2013.01); *G06F 3/1238* (2013.01); *G06F 3/1285* (2013.01); *H04N 1/00846* (2013.01); *H04N 1/32096* (2013.01); *H04N 1/444* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,991,317 | B2 * | 8/2011 | Kato ................... | G03G 15/502 |
| | | | | 358/448 |
| 2005/0258246 | A1 * | 11/2005 | Wolff ...................... | G06F 16/93 |
| | | | | 235/454 |
| 2007/0216935 | A1 * | 9/2007 | Osamura ............... | G06F 3/1287 |
| | | | | 358/1.15 |
| 2009/0109482 | A1 * | 4/2009 | Sato ................... | H04N 1/32037 |
| | | | | 358/1.15 |
| 2010/0060922 | A1 * | 3/2010 | Teranoshita .......... | G06F 3/1222 |
| | | | | 358/1.13 |
| 2010/0073733 | A1 * | 3/2010 | Hosoi .................. | H04N 1/4433 |
| | | | | 358/448 |
| 2010/0157349 | A1 * | 6/2010 | Hong ................. | H04N 1/32144 |
| | | | | 358/1.14 |
| 2017/0075635 | A1 * | 3/2017 | Maemura .............. | G06F 3/1285 |
| 2017/0214829 | A1 * | 7/2017 | Nakabayashi ..... | H04N 1/32144 |
| 2020/0319828 | A1 * | 10/2020 | Petersen ............ | G06K 15/4095 |

FOREIGN PATENT DOCUMENTS

JP  2007-006083 A  1/2007

* cited by examiner

*Primary Examiner* — Miya J Williams
(74) *Attorney, Agent, or Firm* — Oliff PLC (57) ABSTRACT

An information processing apparatus includes a processor configured to: acquire an image serving as a target of processing and information about the image; and if the information about the acquired image satisfies a condition, perform to a destination an inquiry as to whether the destination grants outputting of the image, and output the image if a notification that the destination has granted the outputting of the image is received from the destination.

10 Claims, 6 Drawing Sheets

| VERIFICATION SCREEN |
|---|
| DO YOU PERFORM TO THE FOLLOWING DESTINATION THE INQUIRY AS TO WHETHER THE OUTPUTTING OF THE TARGET IMAGE IS TO BE GRANTED? |

| DESTINATION | ADMINISTRATOR OF IMAGE PROCESSING SYSTEM |
|---|---|

B3 — [ INQUIRY ]   [ CHANGE DESTINATION ] — B4

FIG. 8B

| VERIFICATION SCREEN |
|---|
| SELECT INQUIRY DESTINATION |

| DESTINATION | ADMINISTRATOR OF IMAGE PROCESSING SYSTEM |
|---|---|
|  | DEPUTY ADMINISTRATOR<br>PERSON SUPERIOR TO USER<br>GROUP LEADER OF USERS |

C1

INFORMATION PROCESSING APPARATUS THAT PERFORMS INQUIRY BEFORE OUTPUTTING IMAGE

CROSS-REFERENCE TO RELATED APPLICATIONS

This application is based on and claims priority under 35 USC 119 from Japanese Patent Application No. 2020-114984 filed Jul. 2, 2020.

BACKGROUND

(i) Technical Field

The present disclosure relates to an information processing apparatus.

(ii) Related Art

Japanese Unexamined Patent Application Publication No. 2007-006083 discloses a technique that outputs a document including a message. According to the disclosed technique, output inhibition rules are obtained by analyzing and registering an input document, and a determination as to which output inhibition rule to apply is made. Messages in the document responsive to the determined rule include a message whether outputting of the input document is to be granted and a message related to a method to be used to output the document if the outputting of the document is granted.

According to the technique disclosed in Japanese Unexamined Patent Application Publication No. 2007-006083, if the output inhibition rule that is registered to restrict the outputting of the image is used, re-registering of an output inhibition rule is to be performed when a target to be restricted is changed in response to a change in the situation.

SUMMARY

Aspects of non-limiting embodiments of the present disclosure relate to reducing time consumed to re-register an output inhibition rule when the target of the output restriction is changed than when the output inhibition rule registered in the technique that restricts the outputting of an image is used.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes a processor configured to: acquire an image serving as a target of processing and information about the image; and if the information about the acquired image satisfies a condition, perform to a destination an inquiry as to whether the destination grants outputting of the image, and output the image if a notification that the destination has granted the outputting of the image is received from the destination.

BRIEF DESCRIPTION OF THE DRAWINGS

Exemplary embodiments of the present disclosure will be described in detail based on the following figures, wherein.

DETAILED DESCRIPTION

1. Exemplary Embodiment

Figure 1:
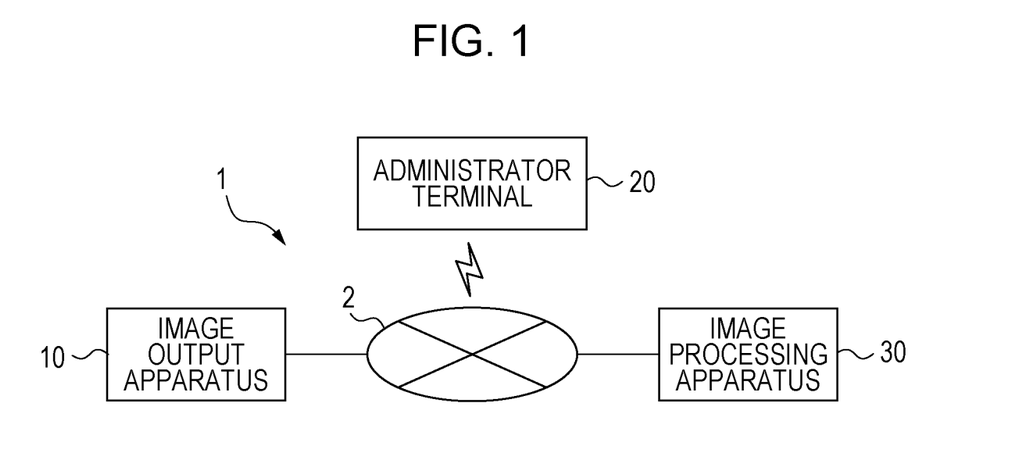
FIG. 1 illustrates a configuration of an image processing system of an exemplary embodiment.

FIG. 1 illustrates a configuration of an image processing system 1 of an exemplary embodiment. The image processing system 1 includes a communication network 2, image output apparatus 10, administrator terminal 20, and image processing apparatus 30. The image processing system 1 provides an image processing service, including a print operation, copy operation, scan operation, character recognition, translation, and/or data storage.

The communication network 2 is a communication system including a mobile communication network and the Internet and relays data between the image processing system 1 and apparatuses (including terminals and other systems). The communication network 2 is wiredly connected to the image output apparatus 10 and the image processing apparatus 30 and wirelessly connected to the administrator terminal 20.

The communication between each apparatus and the communication network 2 is not limited to the configuration in FIG. 1 and may be performed wirelessly and/or wiredly. The image output apparatus 10 provides the image processing service and has a function of outputting an image.

The image output apparatus 10 has a print function and a copy function and outputs an image to a medium, such as a paper sheet. The image output apparatus 10 has a fax function and outputs an image to a specified destination. The image output apparatus 10 may also have a scan function in which no image is output.

The image processing apparatus 30 provides the image processing service and forms, for example, part of a resource of cloud computing. The image processing apparatus 30 has an optical character recognition (OCR) function and thus recognizes characters in an image. The image processing apparatus 30 may have a function of translating a recognized character string and a function of storing image data created in the image processing. Although a single image processing apparatus 30 is illustrated in FIG. 1, two or more image processing apparatuses 30 may be included and respectively provide different image processing services.

The administrator terminal 20 is used by an administrator who manages the image processing service. The administrator uses the administrator terminal 20 to control the leakage of confidential information included in the image to be processed. Specific function of controlling the leakage of confidential information is described in detail below.

Figure 2:
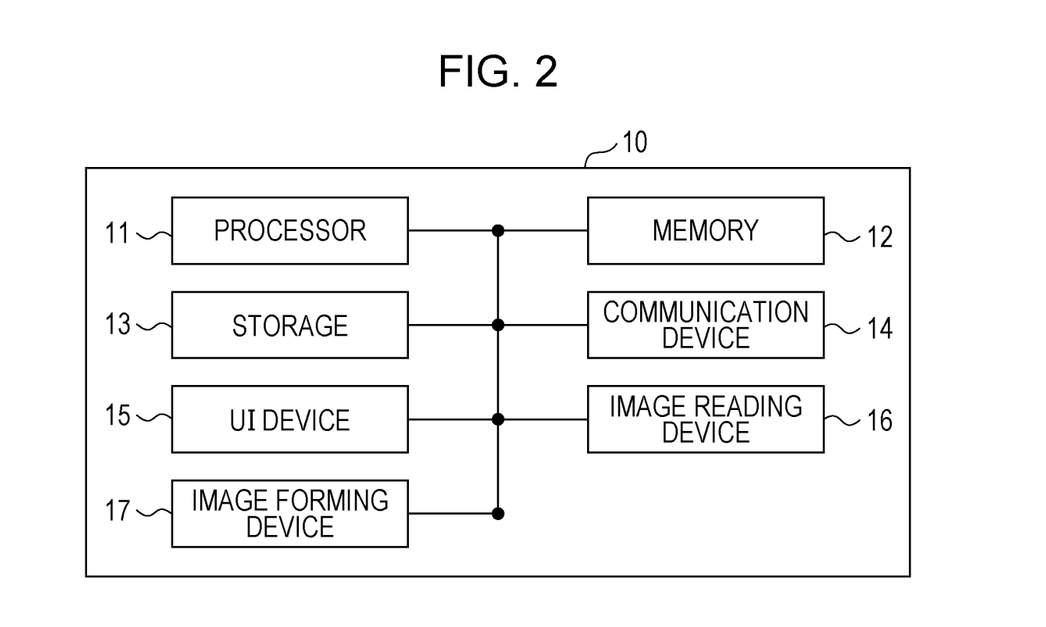
FIG. 2 illustrates a hardware configuration of an authenticating apparatus.

FIG. 2 illustrates a hardware configuration of the image output apparatus 10. The image output apparatus 10 is a computer and includes a processor 11, memory 12, storage 13, communication device 14, user interface (UI) device 15, image reading device 16, and image forming device 17. The processor 11 includes an arithmetic device, such as a central processing unit (CPU), and a peripheral circuit, such as a register. The memory 12 is a recoding medium that the processor 11 is capable of reading, and includes a random-access memory (RAM) and a read-only memory (ROM).

The storage 13 is a recording medium that the processor 11 is capable of reading, and includes a hard disk drive or flash memory. The processor 11 controls the process of each hardware resource by executing a program stored on the ROM or the storage 13 and by using the RAM as a work area. The communication device 14 is a communication medium performing communication via the communication network 2 and includes an antenna and communication circuit.

The UI device 15 is an interface that is provided to a user who uses the image output apparatus 10. The UI device 15 has a touch screen including a display and touch panel mounted on the surface of the display. The UI device 15 displays an image while receiving an operation from the user. The UI device 15 includes, in addition to the touch screen, controls like a keyboard and receives an operation performed on the controls.

The image reading device 16 is a hardware resource (scanner) that reads an image formed on a medium, such as a paper sheet, or an image reading unit that reads an image from a medium set in the image output apparatus 10. The image forming device 17 is a printer that forms an image on a medium, such as a paper sheet. The image forming device 17 transfers and fixes an image on a medium in an electrophotographic system while transporting the medium set in the image output apparatus 10. The image forming device 17 thus forms the image on the medium.

Figure 3:
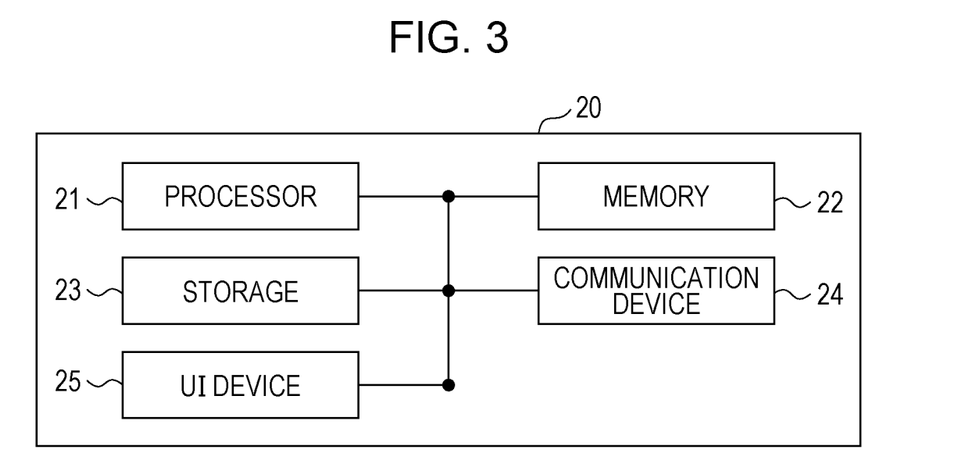
FIG. 3 illustrates a hardware configuration of an image processing apparatus.

FIG. 3 illustrates a hardware configuration of the administrator terminal 20. The administrator terminal 20 includes a processor 21, memory 22, storage 23, communication device 24, and UI device 25. The processor 21 through the UI device 25 are respectively identical in hardware type to the processor 11 through the UI device 15 illustrated in FIG. 2.

Figure 4:
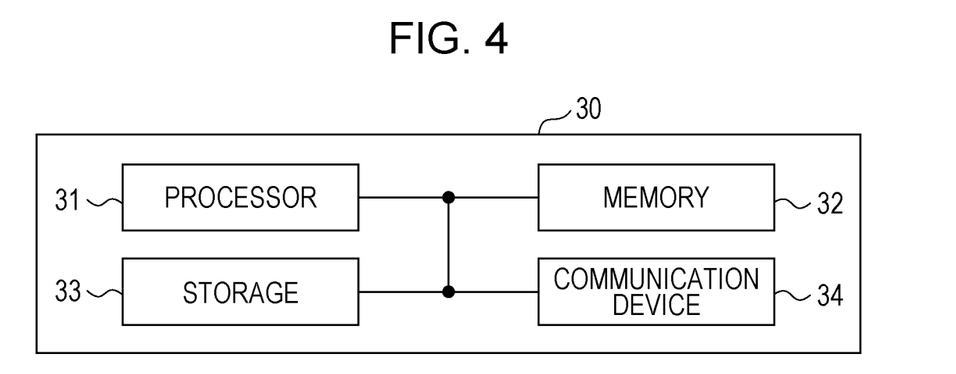
FIG. 4 illustrates a hardware configuration of a user terminal.

FIG. 4 illustrates a hardware configuration of an image processing apparatus 30. The image processing apparatus 30 includes a processor 31, memory 32, storage 33, and communication device 34. The processor 31 through the communication device 34 are respectively identical in hardware type to the processor 11 through the communication device 14 illustrated in FIG. 2.

Functions described below are implemented in the image processing system 1 when the processors described above execute programs. The operation of each function is represented as an operation of the processor in each apparatus that implements the function thereof.

Figure 5:
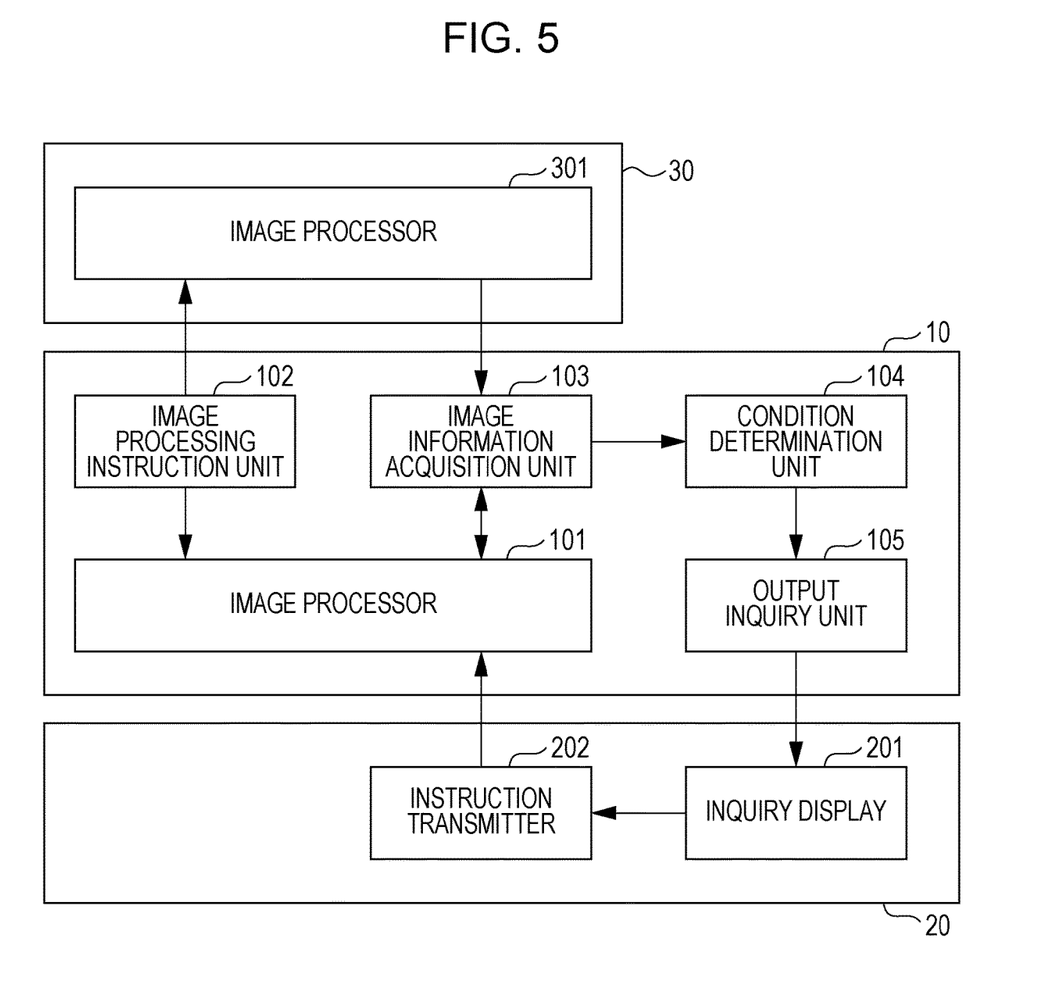
FIG. 5 illustrates a functional configuration of the image processing system.

FIG. 5 illustrates a functional configuration of the image processing system 1. The image output apparatus 10 includes an image processor 101, image processing instruction unit 102, image information acquisition unit 103, condition determination unit 104, and output inquiry unit 105. The administrator terminal 20 includes an inquiry display 201 and instruction transmitter 202. The image processing apparatus 30 includes an image processor 301.

The image processor 101 in the image output apparatus 10 performs the image processing related to the image processing service provided by the image output apparatus 10. According to the exemplary embodiment, the image processor 101 performs the image processing including a print operation, copy operation, scan operation, and/or fax operation. The image processor 301 in the image processing apparatus 30 performs image processing related to an image processing service provided by the image processing apparatus 30. According to the exemplary embodiment, the image processor 301 performs the image processing including a character recognition operation, translation operation, and/or data storage operation.

The image processing instruction unit 102 in the image output apparatus 10 receives an operation from a user and instructs the image processor 101 and the image processor 301 to perform the image processing indicated by the received operation. For example, the image processing instruction unit 102 displays a menu screen listing image processing services provided by the image output apparatus 10 and the image processing services provided by the image processing apparatus 30. The image processing instruction unit 102 performs the image processing related to the image processing service selected on the menu screen.

In response to the reception of an instruction from the image processing instruction unit 102, the image processor 101 and image processor 301 perform the image processing responsive to the instruction. If an operation, such as the scan operation that does not involve image outputting, is performed, the image processor 101 completes the image processing. On the other hand, if a print operation, a copy operation, or a fax operation, each involving the image outputting, is performed, the image processor 101 feeds, before performing the image processing, to the image information acquisition unit 103 an image serving as an operation target and information related to the image (hereinafter referred to as "image-related information").

If the print operation is performed, the image serving as the operation target is an image to be printed. If the scan operation is performed, the image serving as the operation target is an image that has been scanned. According to the exemplary embodiment, the image-related information represents a character, symbol or mark included in the image. For example, the character, symbol, or mark is represented by a feature value, such as histograms of oriented gradients (HOG) or scaled invariance feature transform (SIFT), used in image recognition processing.

The image processor 101 calculates a feature value of an image as an operation target and supplies to the image information acquisition unit 103 the image as the operation target together with the calculated feature value as the image-related information. The image information acquisition unit 103 acquires the feature value of the supplied image as the image-related information. The image information acquisition unit 103 also acquires the image as the operation target supplied together with the image-related information.

The image information acquisition unit 103 acquires the image and image-related information from the image processor 101 if the image processor 101 has performed the image processing. If the image processor 301 has performed the image processing, the image information acquisition unit 103 acquires the image and image-related information from the image processor 301. The image information acquisition unit 103 then supplies the acquired image and image-related information to the condition determination unit 104.

The condition determination unit 104 determines whether the supplied image-related information, namely, the image-related information acquired from the image information acquisition unit 103 satisfies a predetermined condition. According to the exemplary embodiment, the predetermined condition is determined to be satisfied if the acquired image-related information includes a specific character, specific symbol, or specific mark.

The specific character indicates that corresponding information is to be protected against leaking to a third party. For example, the specific character may be "classified," "in-house materials," "in-house only," or "confidential." The specific character may be information itself that is to be protected from leaking to a third party. For example, the specific character may include the name of a product before public announcement, personal name, address, and contact information.

As with the specific character, the specific symbol indicates that corresponding information is to be protected against leaking to a third party. For example, the specific symbol is letters TOP SECRET circled. The specific mark indicates where corresponding information is originated from. For example, the specific mark is a corporate logo or a company emblem.

If the condition determination unit 104 determines that the condition is satisfied, the condition determination unit 104 notifies the output inquiry unit 105 that the condition is satisfied. When the output inquiry unit 105 receives the notification, specifically, when the image-related information acquired from the image information acquisition unit 103 is determined to satisfy the predetermined condition, the output inquiry unit 105 performs an inquiry to a specified destination as to whether the destination grants the outputting of the image acquired together with the image-related information.

The output inquiry unit 105 stores as an inquiry destination an Internet protocol (IP) address of the administrator terminal 20. The output inquiry unit 105 creates inquiry data indicating the inquiry and performs the inquiry by transmitting the inquiry data to the stored destination. The inquiry display 201 in the administrator terminal 20 displays contents of the inquiry indicated by the received inquiry data.

Figure 6:
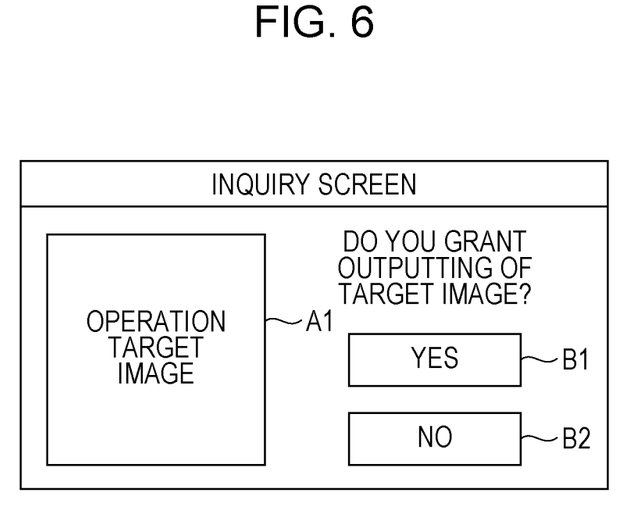
FIG. 6 illustrates an example of displayed inquiry contents.

FIG. 6 illustrates an example of displayed the contents of the inquiry. Referring to FIG. 6, the inquiry display 201 displays, as an inquiry screen, an operation target screen A1, character string reading "Do you grant outputting of the target image?", yes button B1, and no button B2. The inquiry display 201 may display the inquiry screen in FIG. 6 when the inquiry data is received or when the administrator using the administrator terminal 20 performs an operation to open the inquiry screen.

The administrator views the target screen A1 to determine whether to grant the outputting of the target screen A1. For example, if the target screen A1 includes only published information labeled "In-house materials," the administrator grants the outputting of the target screen A1 (Yes). If the target screen A1 includes undisclosed information labeled "In-house only," the administrator does not grant the output of the target screen A1 (No).

If the administrator decides to grant the outputting of the target screen A1, he or she presses the yes button B1. If the administrator decides to not grant the outputting of the target screen A1, he or she presses the no button B2. The inquiry display 201 notifies the instruction transmitter 202 of information on the pressed button. In response to the notification, the instruction transmitter 202 transmits to the image output apparatus 10 instruction data from the administrator about whether the outputting of the target screen A1 is to be granted.

The image processor 101 in the image output apparatus 10 receives the instruction data. If the received instruction data indicates that the administrator grants the outputting of the target screen A1, the image processor 101 performs an operation to output the target screen A1. Since the image processor 101 performs the inquiry before the image processor 101 performs the operation to output the target screen A1, the image processor 101 outputs the target screen A1 by performing that operation.

If the print operation or the copy operation is to be performed, the image processor 101 outputs the target screen A1 onto a medium, such as a paper sheet. If the fax operation is to be performed, the image processor 101 outputs the target screen A1 to a fax destination. In this way, if the image processor 101 has received from the inquiry destination the notification that the inquiry destination grants the outputting of the image, the image processor 101 outputs that image.

According to the exemplary embodiment, if an inquiry has been performed, the image processor 101 outputs the image without an operation to output the image. In this way, time consumed for the image processing service by the user may be reduced in comparison with when the operation to output the image is performed. The outputting of the image is not performed if the received instruction data on the administrator instruction indicating that the outputting of the target screen A1 is not granted.

Each apparatus in the image processing system 1 is configured as described above to perform a control process to control a determination as to whether the image outputting is granted.

Figure 7:
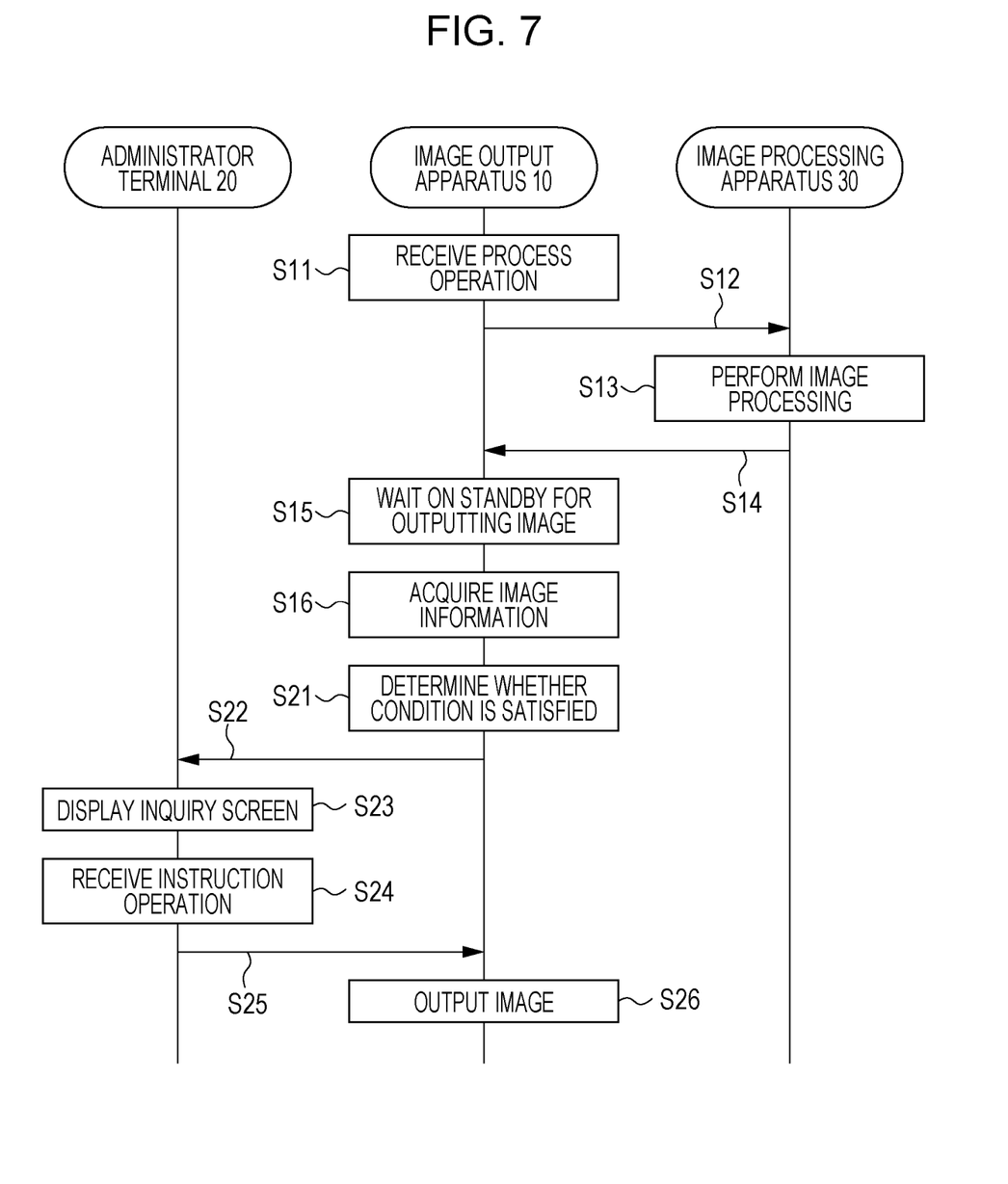
FIG. 7 illustrates an operation procedure of a control process.

FIG. 7 illustrates an operation procedure of the control process. The image output apparatus 10 (the image processing instruction unit 102) receives a user operation indicating the image processing (step S11). The operation procedure in FIG. 7 is based on the premise that an instruction operation that the image output apparatus 10 outputs to perform the image processing on the image processed by the image processing apparatus 30 has been received.

The image output apparatus 10 (the image processing instruction unit 102) transmits to the image processing apparatus 30 the instruction data to perform the specified image processing (step S12). The image processing apparatus 30 (the image processor 301) performs the image processing indicated by the received instruction data (step S13) and transmits to the image output apparatus 10 the processed target image and image-related information (step S14).

The image output apparatus 10 (the image processor 101) is instructed to output the received target image but waits on standby before outputting the target image (step S15). The image output apparatus 10 (the image information acquisition unit 103) acquires the image-related information transmitted in step S14 (step S16). The image output apparatus 10 (the condition determination unit 104) determines whether the acquired image-related information satisfies the predetermined condition (step S21).

The predetermined condition may now be satisfied in FIG. 7. In such a case, the image output apparatus 10 (the output inquiry unit 105) transmits to the administrator terminal 20 inquiry data together with the image-related information. The inquiry data is used to perform an inquiry as to whether the outputting of the acquired target image is to be granted (step S22). The administrator terminal 20 (the inquiry display 201) displays the contents of the inquiry indicated by the received inquiry data (step S23).

The administrator terminal 20 (the instruction transmitter 202) receives from the administrator an administrator instruction as to whether the administrator has granted the outputting of the target image (step S24) and transmits instruction data indicating the instruction to the image output apparatus 10 (step S25). The operation procedure in FIG. 7 is based on the premise that the instruction to grant the outputting of the target image has been received. In that case, the image output apparatus 10 (the image processor 101) cancels the image output standby state started in step S15 and then outputs the target image (step S26).

According to the exemplary embodiment, the outputting of the image is restricted as described above. A technique that uses a registered output inhibition rule to restrict the outputting of the image by using is available. However, this technique involves re-registering an output inhibition rule when a target to be restricted is changed in response to a change in the situation. According to the exemplary embodiment, the inquiry as to whether the outputting of the image is to be granted is performed to the specified destination and the instruction from the destination is followed. This operation may result in shorter time consumed when the target of the output restriction is changed than when the registered output inhibition rule is used.

According to the exemplary embodiment, information indicating a character, symbol, or mark included in the image is used as the image-related information. If a specific character, specific symbol, or specific mark is not included in the image, a respondent to the inquiry (the administrator in the exemplary embodiment) may spend less time.

2. Modifications

2.1 Image-Related Information

According to the exemplary embodiment, the image-related information is a character, symbol or mark included in the image. The image-related information is not limited to the character, symbol or mark. For example, if the image processing is a fax operation, the fax number of a fax destination or fax addressee may be used as the image-related information. In that case, if the image-related information includes a fax number or fax addressee that is registered as an inappropriate output destination of the image, the condition is determined to be satisfied.

The image-related information may be the number of images to be output. In such a case, if the number of images indicated by the image-related information is equal to or above a threshold, the condition determination unit 104 determines that the condition is satisfied. With this setting, more emphasis is placed on convenience if the number of images is relatively small and a damage caused by information leak is considered relatively light, or more emphasis is placed on security if the number of images is relatively large and the damage caused by information leak is considered relatively heavy.

2.2 Omission of Inquiry

According to the exemplary embodiment, if the image-related information satisfies the condition, the inquiry as to whether the outputting of the image is to be granted is typically performed. Alternatively, the inquiry may be omitted. For example, the inquiry as to whether the outputting of the image is to be granted is not performed if the position of the image output apparatus 10 is within a predetermined area.

Specifically, if the position of the image output apparatus 10 is outside the predetermined area, the inquiry as to whether the outputting of the image is to be granted is performed. For example, a chain store operator may install image output apparatuses 10 at premises nationwide. The premises include a store where unspecified people visit and an office where persons with clear identities visit. In such a case, the area of the office is set to be the predetermined area.

If the position of the image output apparatus 10 is within the area of the office, the output inquiry unit 105 does not perform the inquiry as to whether the outputting of the image is to be granted. If the position of the image output apparatus 10 is outside the area of the office, in other words, the position of the image output apparatus 10 is within the area of the store, the output inquiry unit 105 performs the inquiry as to whether the outputting of the image is to be granted. As a result, if the image output apparatus 10 is within the predetermined area, the target image is output without the output inquiry unit 105 performing the inquiry.

If the position of the image output apparatus 10 is not within the predetermined area, the image processor 101 outputs the target image after the output inquiry unit 105 performs the inquiry. In comparison with the case in which the inquiry is performed at each image output operation, the inquiry is performed at each image output operation to reduce the risk of information leak in the store where there is a good chance that the output image is looked at by people. In the environment where there are only people entitled to look at the output image, the inquiry is not performed. Time may thus be saved for the administrator and the convenience of the user may be increased.

If the present time is within a predetermined time range, the output inquiry unit 105 may not perform the inquiry as to whether the outputting of the image is to be granted. Specifically, if the present time is not within a predetermined time range, the output inquiry unit 105 may perform the inquiry as to whether the outputting of the image is to be granted. The predetermined time range may be working hours (for example, from 9:00 to 17:00).

If the present time is within the working hours, the output inquiry unit 105 does not perform the inquiry as to whether the outputting of the image is to be granted. If the present time is not within the working hours, in other words, if the present time is outside the working hours, the output inquiry unit 105 performs the inquiry as to whether the outputting of the image is to be granted. As a result, if the present time is within the working hours, the image processor 101 outputs the target image without the output inquiry unit 105 performing the inquiry.

If the present time is not within the working hours, the image processor 101 outputs the target image after the output inquiry unit 105 has performed the inquiry. The inquiry is not performed during the working hours since there is a good change that the output image may be looked at by people. In comparison with the case in which the inquiry is performed at each image output operation, time may thus be saved for the administrator and the convenience of the user may be increased. Outside the working hours, the inquiry is performed to reduce the risk of information leak.

If an image serving as an operation target is output in the past, the output inquiry unit 105 may not perform the inquiry as to whether the outputting of the image is to be granted. In other words, if an image serving as the operation target is not output in the past, the output inquiry unit 105 performs the inquiry as to whether the outputting of the image is to be granted. In such a case, if the image serving as the operation target is output in the past, the image processor 101 outputs the target image without the output inquiry unit 105 performing the inquiry.

If the image serving as the operation target is not output in the past, the image processor 101 outputs the target image after the output inquiry unit 105 performs the inquiry. Convenience at which an operation is repeated on the same image is higher than when the inquiry is performed at each image output operation.

2.3 Change of Inquiry Destination

According to the exemplary embodiment, the inquiry destination of the output inquiry unit 105 is fixed, but the inquiry destination may be changed. For example, the output inquiry unit 105 changes the inquiry destination in response to an operation on the image output apparatus 10. In that case, the output inquiry unit 105 displays a screen used to verify an inquiry destination.

Figure 8A:
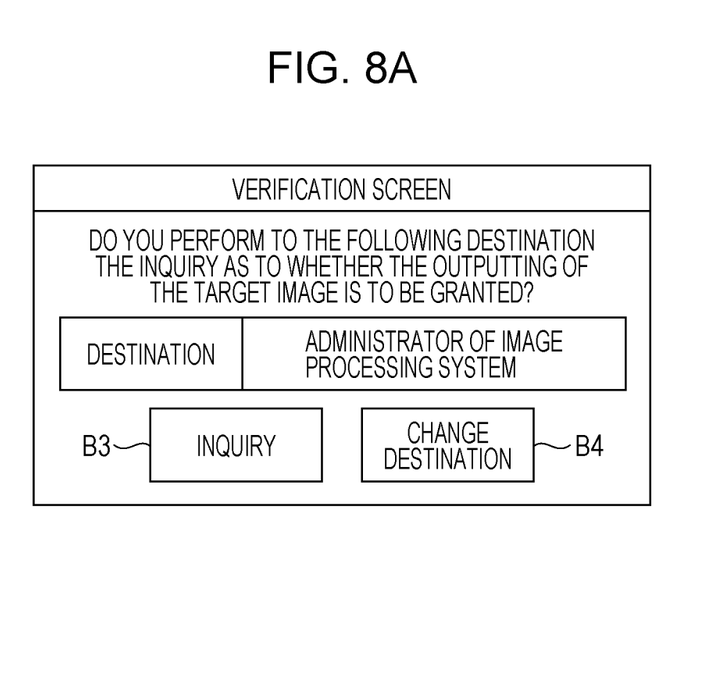
FIGS. 8A and 8B illustrate examples of a displayed verification screen.

FIGS. 8A and 8B illustrate examples of a displayed verification screen. Referring to FIG. 8A, the output inquiry unit 105 displays on the verification screen a character string reading "Do you perform to the following destination the inquiry as to whether the outputting of the target image is to be granted?", "administrator of image processing system" as a default destination, "inquiry" button B3, "change destination" button B4. If the check button B3 is pressed, the output inquiry unit 105 performs the inquiry to the displayed destination.

Figure 8B:
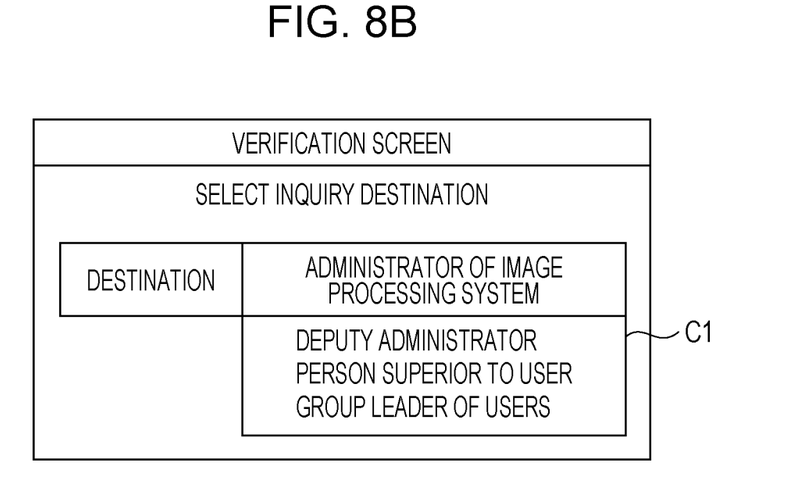

If the change destination button B4 is pressed, the output inquiry unit 105 displays, as illustrated in FIG. 8B, a character string reading "Select inquiry destination," and list C1 of destinations to be selected. The list C1 lists a "deputy administrator" of the image processing system, "person superior to user", and "group leader of users," as destinations other than the administrator of the image processing system 1.

When one of the destinations is selected from the list C1, the output inquiry unit 105 displays the verification screen in FIG. 8A with the destination changed to the selected destination. If the check button B3 is pressed, the inquiry is performed to the displayed destination, namely, the destination selected by the user. According to the modification, the inquiry as to whether the outputting of the image is to be granted is performed to the destination that is selected by the user will.

2.4 Partial Operation

According to the exemplary embodiment, the image processor 101 does not output the target image until the inquiry destination notifies the output apparatus 10 that the outputting of the image is granted. Alternatively, according to the modification, the image processor 101 performs a portion of the operation to output the target image before the notification is received.

The image processor 101 performs as a portion of the operation (partial operation) an operation to display a preview of the target image before an output grant notification. In this way, the user is free from viewing the preview after the notification. The outputting of the image may thus be more quickly performed than when the operation to display the preview of the target image before the notification is not performed.

The image processor 101 may perform as the partial operation an operation to output a non-confidential page before the output grant notification. When the notification that the outputting of the image is granted is received, the image processor 101 may output all the images including a confidential page that is not output in the partial operation or only the confidential page. In this way, the non-confidential page is viewed before the notification, and time to verify the image output after the notification may be reduced in comparison with the partial operation is not performed.

The image processor 101 performs as the partial operation an operation to output a dummy page before the output grant notification. When the notification of the output grant is received, the image processor 101 may output all the pages with an original page replaced with the dummy page or only the original page. Since the non-confidential page may be viewed before the notification, time to verify the image output after the notification may be reduced in comparison with when the partial operation is not performed. In each of the above examples, the time involved after the notification may be reduced in comparison with when the partial is not performed.

2.5 Functional Configuration

The functional configuration implemented in the image processing system 1 is not limited to those in FIG. 5 and other figures. According to the exemplary embodiment, the image processor 101 in the image output apparatus 10 performs the operation to execute the variety of image processing, the operation to calculate the feature value of the image, and the operation to output an image if the outputting of the image is granted. These operations may be individually performed.

The operation of the condition determination unit 104 and the operation of the output inquiry unit 105 may be integrated into a single function. The function of the image output apparatus 10 may be implemented by two or more information apparatuses or by a computer resource provided by a cloud service. As long as the functions illustrated in FIG. 5 and other figures are implemented by the whole information processing system, the range of the operation of each function and an apparatus implementing the function are flexibly determined.

2.6 Processors

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

2.7 Range of the Disclosure

The disclosure is construed as an information processing apparatus, such as an authentication apparatus, image processing apparatus, or user terminal. The disclosure is also construed as an information processing system (such as the image processing system 1) including each information processing apparatus. The disclosure is construed as an information processing method that implements the process of each information processing apparatus. The disclosure is also construed as a computer program causing a computer to control each information processing apparatus. The program may be distributed in a form of a recording medium, such as an optical disk storing the program or may be distributed by downloading the program to the computer via a communication network, such as the Internet, to install the program to the computer for use.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to
    acquire an image and information about the image that satisfies a condition,
    inquire with a destination whether the destination grants authorization to output of the image, and
    output the image responsive to the destination granting the authorization, wherein
    the processor is configured to output the image without performing the inquiry if present time of day falls within a specific range,
    the processor is configured to cause a portion of the image to be output before the authorization is received, and
    the processor is configured to output the image without performing the inquiry if the image was output previously.

2. The information processing apparatus according to claim 1, wherein the processor is configured to output the image without an operation to output the image if the destination has granted the authorization.

3. The information processing apparatus according to claim 2, wherein the information comprises a character, a symbol, or a mark.

4. The information processing apparatus according to claim 3, wherein the processor is configured to, if a position of the information processing apparatus is within a specific area, output the image without performing the inquiry.

5. The information processing apparatus according to claim 2, wherein the processor is configured to, if a position of the information processing apparatus is within a specific area, output the image without performing the inquiry.

6. The information processing apparatus according to claim 2, wherein the processor is configured to change the destination of the inquiry in response to an operation on the information processing apparatus.

7. The information processing apparatus according to claim 1, wherein the information comprises a character, a symbol, or a mark.

8. The information processing apparatus according to claim 7, wherein the processor is configured to, if a position of the information processing apparatus is within a specific area, output the image without performing the inquiry.

9. The information processing apparatus according to claim 1, wherein the processor is configured to, if a position of the information processing apparatus is within a specific area, output the image without performing the inquiry.

10. The information processing apparatus according to claim 1, wherein the processor is configured to change the destination of the inquiry in response to an operation on the information processing apparatus.

* * * * *